United States Patent
Downs et al.

(10) Patent No.: US 9,151,368 B2
(45) Date of Patent: Oct. 6, 2015

(54) TWO POSITION ACTUATOR WITH SENSING AND CONTROL

(75) Inventors: James P. Downs, South Lyon, MI (US); John C. Hibbler, Lake Orion, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 83 days.

(21) Appl. No.: 14/009,120

(22) PCT Filed: Apr. 6, 2012

(86) PCT No.: PCT/US2012/032457
§ 371 (c)(1),
(2), (4) Date: Oct. 1, 2013

(87) PCT Pub. No.: WO2012/138953
PCT Pub. Date: Oct. 11, 2012

(65) Prior Publication Data
US 2014/0144259 A1    May 29, 2014

Related U.S. Application Data

(60) Provisional application No. 61/472,728, filed on Apr. 7, 2011.

(51) Int. Cl.
*B60K 23/08* (2006.01)
*F16H 25/08* (2006.01)
*F16D 48/06* (2006.01)

(52) U.S. Cl.
CPC .............. *F16H 25/08* (2013.01); *B60K 23/08* (2013.01); *F16D 48/064* (2013.01); *B60K 2023/0858* (2013.01); *B60W 2510/0225* (2013.01); *B60Y 2400/414* (2013.01); *F16D 2500/1025* (2013.01); *F16D 2500/10431* (2013.01); *F16D 2500/10462* (2013.01); *F16D 2500/3026* (2013.01); *F16D 2500/3028* (2013.01); *Y10T 74/18296* (2015.01)

(58) Field of Classification Search
None
See application file for complete search history.

(56) References Cited

U.S. PATENT DOCUMENTS

| | | | |
|---|---|---|---|
| 5,092,188 A | 3/1992 | Fujikawa et al. | |
| 6,230,577 B1 | 5/2001 | Showalter et al. | |
| 6,315,073 B1 * | 11/2001 | Nonaka | 180/247 |
| 2002/0134182 A1 | 9/2002 | Schleuder et al. | |
| 2004/0163916 A1 * | 8/2004 | Showalter | 192/48.2 |
| 2006/0046888 A1 * | 3/2006 | Puiu | 475/151 |

FOREIGN PATENT DOCUMENTS

JP    H-08-223983 A    8/1996

OTHER PUBLICATIONS

International Search Report and Written Opinion for PCT/US2012/032457, mailed Jan. 2, 2013; ISA/KR.

* cited by examiner

*Primary Examiner* — Rodney H Bonck
(74) *Attorney, Agent, or Firm* — Harness, Dickey & Pierce, P.L.C.

(57) ABSTRACT

An actuator that causes a mode clutch to shift between an engaged position and a disengaged position is provided. The actuator comprises a motor having an output. A shift cam is caused to rotate based on the output of the motor. The shift cam has a cam profile surface. A cam follower rides along the cam profile surface upon rotation of the shift cam. Movement of the cam follower causes movement of a mode fork resulting in the mode clutch shifting between the engaged and disengaged positions. A sensor outputs a voltage to a controller based on a physical location of the cam follower. The controller activates the motor based on the voltage.

11 Claims, 5 Drawing Sheets

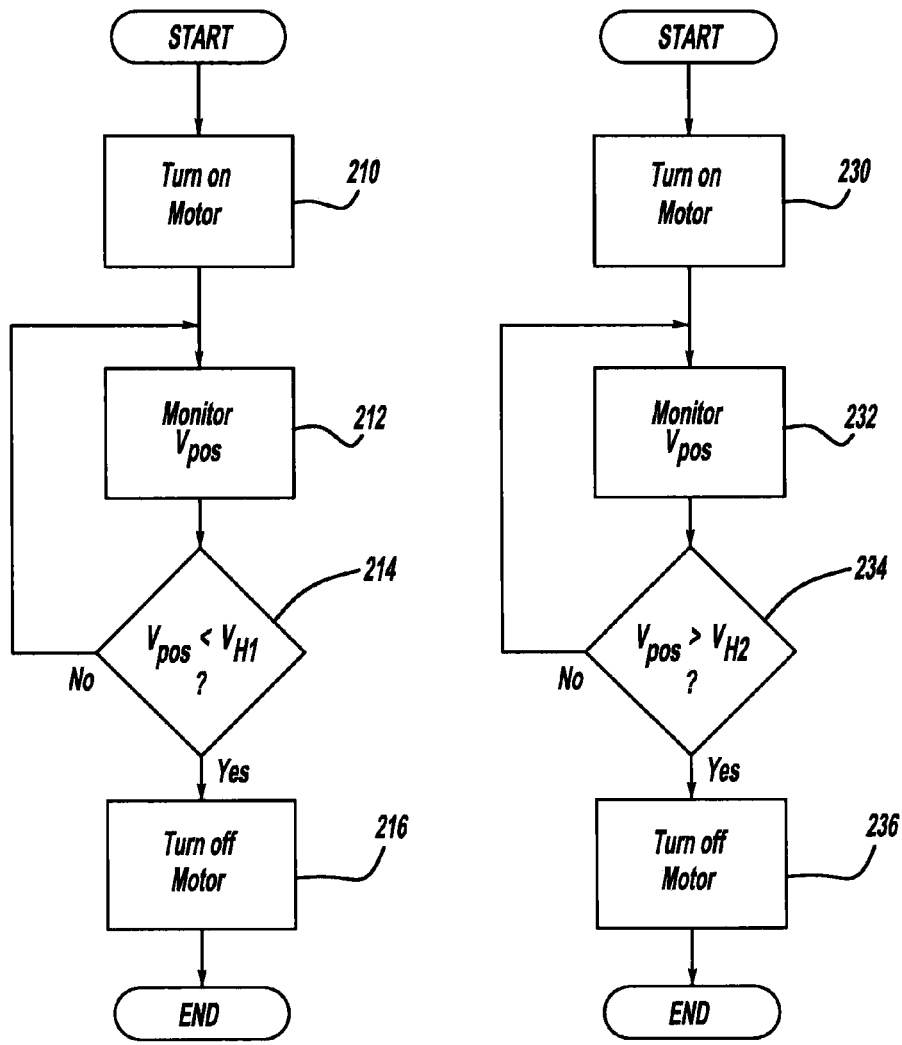

TWO POSITION ACTUATOR WITH SENSING AND CONTROL

This application is a 371 U.S. National Stage of International Application No. PCT/US2012/032457, filed Apr. 6, 2012, and claims priority to U.S. Provisional Patent Application No. 61/472,728, filed Apr. 7, 2011, the disclosures of which are herein incorporated by reference in their entirety.

FIELD

The present disclosure relates generally to a power transfer system for controlling the distribution of drive torque between the primary and secondary drivelines of a four-wheel drive vehicle. More particularly, the present disclosure relates to an actuator and related mode clutch of a transfer case that is operable for selectively transferring drive torque from the primary driveline to the secondary driveline.

BACKGROUND

This section provides background information related to the present disclosure which is not necessarily prior art.

Due to increased demand for four-wheel drive vehicles, many power transmission systems are being incorporated into vehicle driveline applications for transferring drive torque to the wheels. In many four-wheel drive vehicles, a transfer case is installed in the drive train and is normally operable to deliver drive torque to the primary driveline for establishing a two-wheel drive mode. The transfer case is further equipped with a clutch assembly that can be selectively or automatically actuated to transfer drive torque to the secondary driveline for establishing a four-wheel drive mode. The clutch assembly can typically include multiple sensors that provide feedback to a controller to determine a particular drive mode.

In many examples, an actuator in the form of an electric motor is provided for influencing translation of a mode fork to change the drive mode between two-wheel drive mode and four-wheel drive mode. The four-wheel drive mode can result from meshing engagement of a pair of cooperating gears such as on a mode sleeve that moves in response to movement of the mode fork and a drive sprocket associated with the secondary driveline. Typically, the electric motor is configured for rotating in a first direction to influence the mode fork to translate in a first direction (such as for shifting from the two-wheel drive mode to the four-wheel drive mode) and configured to rotate in an opposite direction to influence translation of the mode fork in a second opposite direction (such as for shifting from the four-wheel drive mode to the two-wheel drive mode). In some examples, corresponding splines formed on the corresponding gears may not be immediately aligned during shifting between modes. In such a circumstance, continued rotation of one of the gears is necessary until a biasing member urges the shift fork into the engaged position. Therefore, it is typical to incorporate a first sensor that senses a motor position and a second sensor that senses a mode fork position. A need exists in the art to provide a simpler, more cost effective actuator that transfers drive torque between a two-wheel drive mode and a four-wheel drive mode.

SUMMARY

This section provides a general summary of the disclosure, and is not a comprehensive disclosure of its full scope or all of its features.

An actuator that causes a mode clutch to shift between an engaged position and a disengaged position is provided. The actuator comprises a motor having an output. A shift cam is caused to rotate based on the output of the motor. The shift cam has a cam profile surface. A cam follower rides along the cam profile surface upon rotation of the shift cam. Movement of the cam follower causes movement of a mode fork resulting in the mode clutch shifting between the engaged and disengaged positions. A sensor outputs a voltage to a controller based on a physical location of the cam follower. The controller activates the motor based on the voltage.

According to other features, the sensor is a Hall effect transducer. The output of the motor is configured to rotate in a first direction for movement of the mode clutch from the engaged position to the disengaged position as well as from the disengaged position to the engaged position. The cam profile surface of the shift cam has a first surface where engagement of the cam follower corresponds to the mode fork being positioned in the engaged position. The cam profile surface of the shift cam has a second surface wherein engagement of the cam follower corresponds to the mode fork being positioned in the disengaged position.

According to still other features, the cam profile surface of the shift cam defines a ramp surface between the first and second surfaces. A biasing member biases the mode fork toward the engaged position.

A method of shifting a mode clutch between an engaged position and a disengaged position is provided. The method includes activating a motor that causes a shift cam to rotate. A cam follower rides along a cam profile of the shift cam causing the mode fork to translate. An output voltage of a sensor is motored. The output voltage varies to correspond with a position of the mode fork. The motor is deactivated based on the output voltage being less than a first voltage threshold.

According to other features, the method further comprises activating the motor based on an output from a mode select mechanism. Subsequent to deactivating the motor, the motor is reactivated based on an output from the mode select mechanism. Reactivating the motor causes the shift cam to rotate and the cam follower to ride along the cam profile causing the mode fork to translate. The output voltage of the sensor is monitored. The motor is deactivated based on the output voltage being greater than a second voltage threshold. Activating and reactivating both comprise rotating an output shaft of the motor in the same direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The present invention will become more fully understood from the detailed description and the accompanying drawings wherein:

FIG. 6 is an exemplary logic flow diagram illustrating steps for shifting the mode clutch from two-wheel drive to four-wheel drive mode; and FIG. 7 is an exemplary logic flow diagram illustrating steps for shifting the mode clutch from four-wheel drive mode to two-wheel drive mode.

Corresponding reference numerals indicate corresponding parts throughout the several views of the drawings.

DETAILED DESCRIPTION

Figure 1:
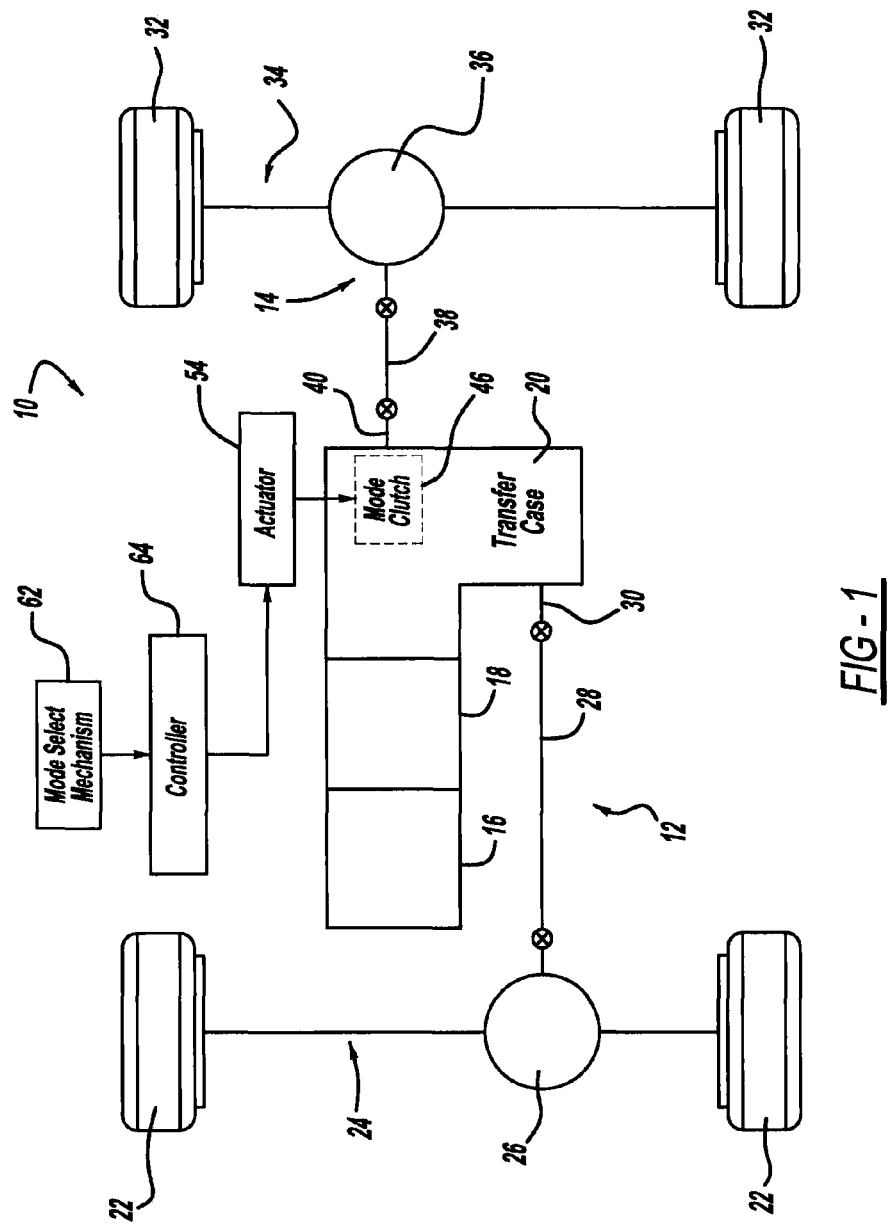
FIG. 1 is a schematic representation of a four-wheel drive motor vehicle equipped with a power transfer system incorporating and a mode clutch according to the present teachings.

Example embodiments will now be described more fully with reference to the accompanying drawings.

The following description of the preferred embodiments is merely exemplary in nature and is in no way intended to limit the invention, its application, or uses. Referring now to the drawings, a drive train for a four-wheel drive vehicle is schematically shown interactively associated with a power transfer system 10 of the present disclosure. The motor vehicle drive train includes a front driveline 12 and a rear driveline 14 both drivable from a source of power, such as an engine 16 through a transmission 18 which may be of the manual or automatic type. In the particular embodiment shown, the drive train includes a transfer case 20 for transmitting drive torque from the engine 16 and the transmission 18 to the front driveline 12 and the rear driveline 14. The front driveline 12 includes a pair of front wheels 22 connected at opposite ends of a front axle assembly 24 having a front differential 26 that is coupled to one end of a front drive shaft 28, the opposite end of which is coupled to a front output shaft 30 of the transfer case 20. Similarly, the rear driveline 14 includes a pair of rear wheels 32 that are connected at opposite ends of a rear axle assembly 34 having a rear differential 36 coupled to one end of a rear drive shaft 38, the opposite end of which is interconnected to a rear output shaft 40 of the transfer case 20. It will be appreciated that while the following discussion is set forth in the context of a transfer case 20 for a four-wheel-drive system, the features of the present disclosure are also applicable to a power take off unit (PTU) of an all-wheel-drive (AWD) system.

The transfer case 20 includes a mode clutch 46. The mode clutch 46 is operable to control torque transfer between the rear output shaft 40 and the front output shaft 30. The power transfer system 10 further includes a power-operated actuator 54 that initiates movement of a mode fork 60 (FIG. 2) of the mode clutch 46 to shift the transfer case between a two-wheel drive mode and four-wheel drive mode as will be described in greater detail herein. A mode select mechanism 62 is operable to permit a vehicle operator to select between a two-wheel drive mode and a four-wheel drive mode. A controller 64 functions to control actuation of the power-operated actuator 54. In particular, the controller 64 functions to control actuation of the power-operated actuator 54 in response to the mode signal sent to the controller 64 from the mode select mechanism 62 for establishing a particular drive mode.

With specific reference now to FIGS. 2 and 3, additional features of the actuator 54 of the present teachings will be discussed. The actuator 54 can generally comprise an electric motor 70, a shift cam 72, a switch 74, and a sensor 76. In the particular example shown, the electric motor 70 is configured to rotate in only a first rotational direction causing the shift cam 72 to rotate around a cam axis 80. More particularly, a gear train 82 is configured between a motor output 84 and the shift cam 72 for transferring rotational motion of the motor output 84 into rotational motion of the shift cam 72 around the cam axis 80.

The shift cam 72 generally comprises a cam body 88 having a cam profile surface 90. The cam profile surface 90 generally comprises a ramp surface 92, a first surface 94, and a second surface 96. In the particular example shown, the first and second surface 94 and 96 are substantially perpendicular to the cam axis 80. As will become appreciated from the following discussion, the mode fork 60 includes a cam follower 100 that is configured to ride on the cam profile surface 90 of the shift cam 72. In this regard, rotation of the shift cam 72 results in translation of the shift fork 60. In the particular example shown, when the cam follower 100 is located on the first surface 94, the mode fork 60 is in a position that corresponds to the mode clutch 46 being in an "engaged" or four-wheel drive mode. When the cam follower 100 is located on the second surface 96 of the shift cam 72, the mode fork 60 is in a position that corresponds to the mode clutch 46 being in a "disengaged" position or in the two-wheel drive mode. Other configurations are contemplated.

Movement of the cam follower 100 of the mode fork 60 along the cam profile surface 90 of the shift cam 72 ultimately causes the front output shaft 30 to become engaged or disengaged based on the selected drive mode. Additionally, translation of the mode fork 60 provides a physical input into the sensor 76. In the particular examples shown, the sensor 76 is a Hall effect transducer that changes an output voltage 110 based on a measured magnetic field. In the example shown, a magnet 112 is disposed on a portion of the mode fork 60. The sensor 76 is configured to sense a magnetic field created by movement of the magnet 112 and, as a result, output a voltage 110 to the controller 64. The output voltage 110 therefore changes in response to a physical position of the mode fork 60.

Figure 2:
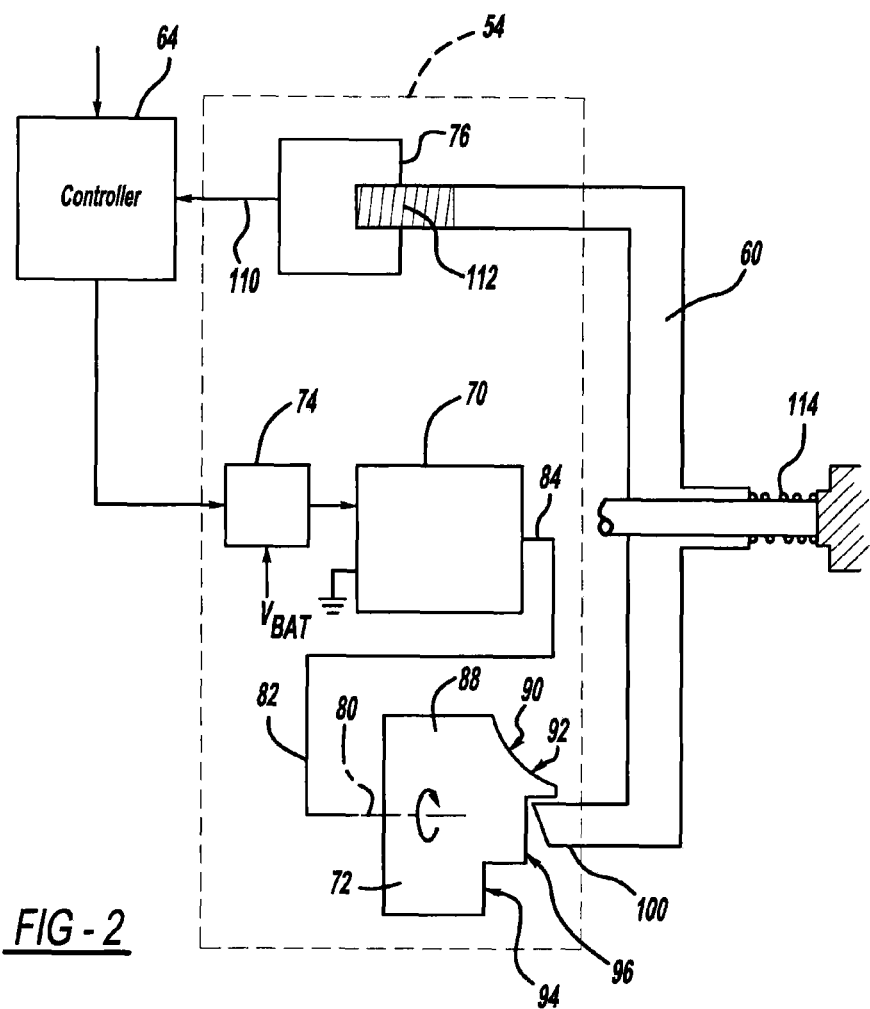
FIG. 2 is a partial schematic representation of the actuator incorporating an electric motor and shift cam, the actuator shown cooperating with a mode fork of the mode clutch shown in FIG. 1.
Figure 2A:
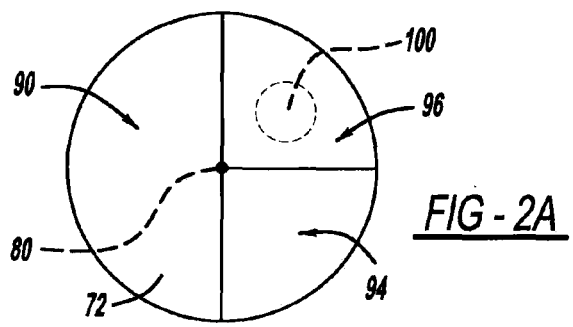
FIG. 2A is a plan view of a cam profile surface of the shift cam.
Figure 3:
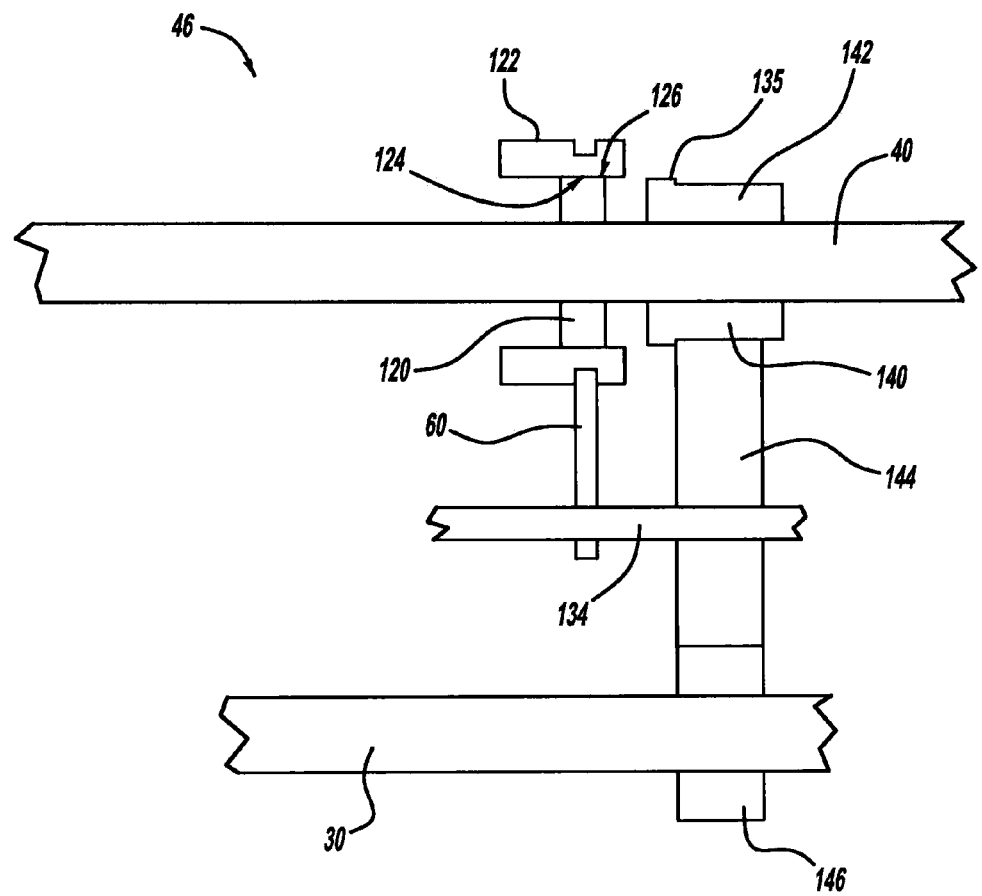
FIG. 3 is a partial schematic representation of the mode clutch of FIG. 1.
Figure 4:
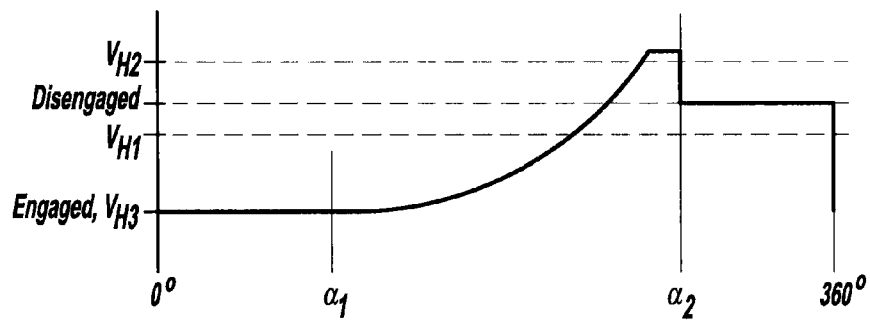
FIG. 4 is a plot illustrating an output voltage of a sensor that is based on a position of the mode fork versus a rotational orientation of the shift cam for a shift cam constructed in accordance to one example of the present teachings.

Turning now to FIGS. 2, 2A and 4, the output voltage 110 is represented as $V_{H3}$, $V_{H1}$, $V_{H2}$. The sensor 76 is configured to output a voltage $V_{H3}$ when the cam follower 100 is located on the first surface 94 of the cam profile surface 90 (four-wheel drive mode). When the mode clutch 46 is shifted from the four-wheel drive mode to the two-wheel drive mode, the shift cam 72 is rotated by the electric motor 70. When the shift cam 72 is caused to rotate around the cam axis 80, the ramp surface 92 of the cam profile surface 90 causes the cam follower 100 to ramp to its peak. Just prior to reaching the peak, the voltage output 110 equals $V_{H2}$. Further rotation of the shift cam 72 around the cam axis 80 causes an overstroke condition where the voltage output 110 exceeds $V_{H2}$. At this point, the cam follower 100 of the mode fork 60 is caused to reach a peak of the ramp surface 92 causing a biasing member 114 to be in an "overcocked" position. Further rotation of the shift cam 72 causes the cam follower 100 to fall off the peak and be urged by a biasing member 114 in a direction leftward as viewed in FIG. 2 and into engagement with the second surface 96 (corresponding to the disengaged position or two-wheel drive mode).

When the mode clutch 46 is shifted from the two-wheel drive mode to the—four wheel drive mode, the shift cam is again rotated by the electric motor 70. Further rotation of the shift cam 72 around the cam axis 80 causes the cam follower 100 of the mode fork 60 to fall off the second surface 96 and be urged by the biasing member 114 into engagement with the first surface 94 (corresponding to the engaged position or four-wheel drive mode). Movement of the cam follower 100 from the second surface 96 to the first surface 94 causes the voltage output 110 to drop below $V_{H1}$. The ramp surface 92, first surface 94 and second surface 96 collectively act as an entrapment feature or barrier to inhibit the mode fork 60 from drifting or migrating out of position. Additionally, the walls that connect the first surface 94 to the second surface 96 and also the second surface 96 to the peak of the ramp surface 92 (both represented horizontally as a 90 degree wall in FIG. 2) discourage motor drift such as during instances where the electric motor 70 has excessive acceleration while the cam follower 100 is ramping along the ramp surface 92. In this regard, the biasing member 114 urges the cam follower 100 back down the ramp surface 92 and onto the first surface 94, against the 90 degree wall. It will be appreciated that the configuration of the biasing member 114 is merely exemplary and many iterations are possible within the scope of the present disclosure.

With the actuator 54 of the present disclosure, the electric motor 70 is only required to rotate in a single direction while still causing the mode clutch 46 to shift between the two-wheel and four-wheel drive modes. Moreover, by monitoring the output voltage 110, the location of the shift fork 60 is known. Additionally, it is not necessary to determine the number of revolutions of the motor output 84 as the location of the shift fork 60 is determined by the output voltage 110.

Figure 5:
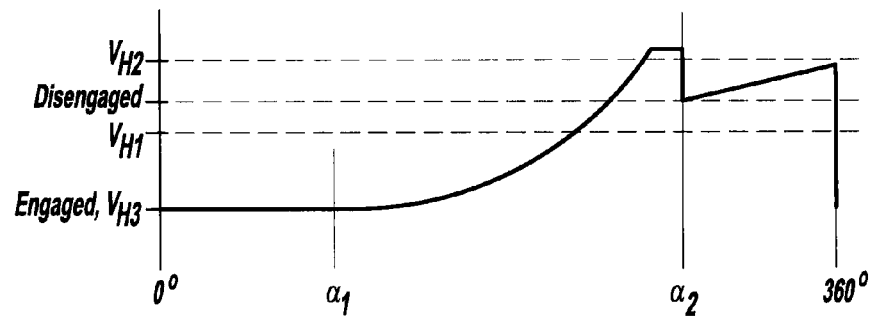
FIG. 5 is a plot illustrating an output voltage of a sensor that is based on a position of the mode fork versus a rotational orientation of the shift cam for a shift cam constructed in accordance to a second example of the present teachings.

FIG. 5 illustrates an output voltage for a shift cam 72 having a different cam profile surface. In the example shown in FIG. 5, a second ramp is provided on the second surface 96 of the shift cam 72. As a result, the output voltage is caused to change along the disengaged zone. In this regard, an increased reliability can be realized as the point of falling off the second surface 96 is anticipated with greater accuracy.

Returning now to FIG. 3, the mode clutch 46 will be further described. It will be appreciated that the mode clutch 46 described herein is merely exemplary and other configurations are contemplated. The mode clutch 46 is provided to selectively shift the transfer case 20 between the two-wheel drive mode and the four-wheel drive mode. The mode clutch 46 includes a hub member 120 that is splined to the rear output shaft 40 and an axially movable mode sleeve 122. In the example shown in FIG. 3, the hub member 120 is shown in a disengaged or two-wheel drive mode position. The mode sleeve 122 includes internal spline teeth 124 which are in constant axial sliding engagement with external spline teeth 126 on the hub member 120. The mode fork 60 is coupled to the mode sleeve 122 for permitting axial movement of the mode sleeve 122 via selective actuation of the mode clutch 46. The mode fork 60 is slidably mounted along a rail 134. Translation of the mode fork 60 along the rail 134 causes the mode sleeve 122 to be selectively shifted between the two-wheel drive mode position (illustrated in FIG. 3) and a four-wheel drive mode position. In the four-wheel drive mode position, the mode sleeve 122 is caused to translate rightward as shown in FIG. 3 such that the internal spline 124 drivingly engages an external spline 135 formed on a chain carrier 140. The chain carrier 140 includes a drive sprocket 142 that engages a chain 144 which is coupled to a driven sprocket 146 that is fixed for rotation around the front output shaft.

With additional reference now to FIG. 6, an exemplary method of shifting the mode clutch 46 from the two-wheel drive mode to the four-wheel drive mode will be described. It will be appreciated that shifting the mode clutch 46 from the two-wheel drive mode to the four-wheel drive mode can correspond with the mode select mechanism 62 being modified by a vehicle operator. It is also contemplated that engagement of the mode clutch 46 into the four-wheel drive mode can be done automatically such as by various sensor inputs. In step 210, control turns on the motor 70. The motor 70 causes the shift cam 72 to rotate around the cam axis 80. The cam follower 100 of the mode fork 60 rides along the cam profile surface 90 of the shift cam 72. Control monitors a $V_{POS}$ (voltage output 110 shown in FIG. 3) in step 212. Control determines if the $V_{POS}$ is less than $V_{H1}$ in step 214. If the $V_{POS}$ is less than the $V_{H1}$, control turns off the motor 70 in step 216. If the $V_{POS}$ is not less than $V_{H1}$, control loops to step 212.

With reference now to FIG. 7, an exemplary method of shifting the mode clutch 46 from the four-wheel drive mode to the two-wheel drive mode will be described. Again, it will be appreciated that initiation of the shifting of the mode clutch 46 can be influenced by a change in status of the mode select mechanism 62. In step 230, control turns on the motor 70. The motor 70 causes the shift cam 72 to rotate around the cam axis 80 and the cam follower 100 of the mode fork to ride along the cam profile surface 90 of the shift cam 72. Control monitors the $V_{POS}$ in step 232. In step 234, control determines if $V_{POS}$ is greater than $V_{H}2$. If $V_{POS}$ is greater than $V_{H}2$, control turns off the motor 70 in step 236. If the $V_{POS}$ is not greater than $V_{H}2$, control loops to step 232.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An actuator that causes a mode clutch to shift between an engaged position and a disengaged position, the actuator comprising:
   a motor having an output;
   a shift cam that is caused to rotate based on the output of the motor, the shift cam having a cam profile surface;
   a cam follower that rides along the cam profile surface upon rotation of the shift cam, wherein movement of the cam follower causes movement of a mode fork resulting in the mode clutch shifting between the engaged and disengaged positions; and
   a sensor that outputs a voltage to a controller, wherein the voltage varies based on a physical location of the cam follower and wherein the controller controls the motor based on the voltage of the sensor output;
   wherein the output of the motor is configured to rotate in a first direction for movement of the mode clutch from the engaged position to the disengaged position as well as from the disengaged position to the engaged position.

2. The actuator of claim 1 wherein the sensor is a Hall effect transducer.

3. The actuator of claim 1 wherein the cam profile surface of the shift cam has a first surface that corresponds to the mode fork being positioned in the engaged position and a second surface that corresponds to the mode fork being positioned in the disengaged position.

4. The actuator of claim 3 wherein the cam profile surface of the shift cam defines a ramp surface between the first and the second surfaces.

5. The actuator of claim 3, wherein the first surface and the second surface are substantially perpendicular to a rotational axis of the shift cam.

6. The actuator of claim 1, further comprising a biasing member that biases the mode fork toward the engaged position.

7. A method of shifting a mode clutch between an engaged position and a disengaged position, the method comprising:
   activating a motor based on an output from a mode select mechanism, wherein activating the motor causes a shift cam to rotate, wherein a cam follower rides along a cam profile of the shift cam causing a mode fork to translate;
   monitoring an output voltage of a sensor, wherein the output voltage varies to correspond with a position of the mode fork;
   deactivating the motor based on the output voltage being less than a first voltage threshold;
   subsequent to deactivating the motor, reactivating the motor based on an output from the mode select mechanism, wherein reactivating the motor causes the shift cam to rotate and the cam follower to ride along the cam profile causing the mode fork to translate, wherein activating and reactivating both comprise rotating an output shaft of the motor in the same direction;
   monitoring the output voltage of the sensor; and
   deactivating the motor based on the output voltage being greater than a second voltage threshold.

8. A method of shifting a mode clutch between an engaged position and a disengaged position, the method comprising:
   activating a motor to rotate an output shaft of the motor in a first rotational direction, rotation of the output shaft causes a shift cam to rotate, wherein a cam follower rides along a cam profile of the shift cam causing a mode fork to translate;
   monitoring an output of a sensor, wherein the output of the sensor varies to correspond with a position of the mode fork;
   deactivating the motor based on the output of the sensor being less than a first output threshold;
   subsequent to deactivating the motor, reactivating the motor to rotate the output shaft of the motor in the first rotational direction to cause the shift cam to rotate and the cam follower to ride along the cam profile causing the mode fork to translate; and
   deactivating the motor based on the output of the sensor being greater than a second output threshold.

9. The method of claim 8, wherein activating the motor is based on an output from a mode select mechanism.

10. The method of claim 8, wherein reactivating the motor is based on an output from a mode select mechanism.

11. The method of claim 8, wherein the output of the sensor is a voltage.

* * * * *